United States Patent
Keatch

(10) Patent No.: US 9,903,006 B2
(45) Date of Patent: Feb. 27, 2018

(54) METHOD OF MERCURY DECONTAMINATION

(71) Applicants: Oilfield Mineral Solutions Limited, Edinburgh (GB); M-I Drilling Fluids U.K. Ltd., Aberdeenshire (GB)

(72) Inventor: Richard Keatch, Edinburgh (GB)

(73) Assignees: Oilfield Mineral Solutions Limited, Edinburgh (GB); M-I Drilling Fluids U.K. Ltd., Aberdeenshire (GB)

( * ) Notice: Subject to any disclaimer, the term of this patent is extended or adjusted under 35 U.S.C. 154(b) by 0 days.

(21) Appl. No.: 14/764,439

(22) PCT Filed: Jan. 27, 2014

(86) PCT No.: PCT/US2014/013174
§ 371 (c)(1),
(2) Date: Jul. 29, 2015

(87) PCT Pub. No.: WO2014/120603
PCT Pub. Date: Aug. 7, 2014

(65) Prior Publication Data
US 2015/0361525 A1    Dec. 17, 2015

Related U.S. Application Data

(60) Provisional application No. 61/757,961, filed on Jan. 29, 2013.

(51) Int. Cl.
| | | |
|---|---|---|
| *C11D 7/10* | (2006.01) | |
| *C22B 43/00* | (2006.01) | |
| *A62D 3/38* | (2007.01) | |
| *C01G 13/00* | (2006.01) | |
| *A62D 101/43* | (2007.01) | |

(52) U.S. Cl.
CPC .............. *C22B 43/00* (2013.01); *A62D 3/38* (2013.01); *C01G 13/00* (2013.01); *C11D 7/105* (2013.01); *A62D 2101/43* (2013.01)

(58) Field of Classification Search
CPC ................................ C22B 43/00; C11D 7/105
USPC ....................................................... 510/110
See application file for complete search history.

(56) References Cited

U.S. PATENT DOCUMENTS

| | | | | |
|---|---|---|---|---|
| 3,790,370 A * | 2/1974 | Lalancette | ............... | C01G 1/12 210/665 |
| 4,094,669 A * | 6/1978 | Balko | ....................... | C02F 9/00 210/651 |
| 4,147,626 A * | 4/1979 | Findlay | ................ | C02F 1/5236 210/724 |
| 4,892,567 A * | 1/1990 | Yan | ........................ | B01D 53/02 210/688 |
| 5,013,358 A * | 5/1991 | Ball | ....................... | C22B 43/00 423/103 |
| 5,460,643 A * | 10/1995 | Hasenpusch | ......... | B01J 20/3204 502/27 |
| 5,463,167 A * | 10/1995 | Ou | ....................... | C10G 25/003 208/251 R |
| 6,942,840 B1* | 9/2005 | Broderick | .............. | B01D 53/64 210/914 |
| 2010/0126909 A1* | 5/2010 | Bhasin | ................... | B01D 15/00 208/135 |

FOREIGN PATENT DOCUMENTS

EP    1268867 B1    12/2004
WO    2011008962 A1    1/2011

OTHER PUBLICATIONS

International Preliminary Report on Patentability issued in corresponding international application No. PCT/2014/013174, dated Aug. 13, 2015 (9 pages).
International Search Report issued in corresponding PCT Application No. PCT/US2014/013174 dated May 13, 2014 (2 pages).
Written Opinion issued in corresponding PCT Application No. PCT/US2014/013174 dated May 13, 2014 (7 pages).
Yongxin Zhao, et al.; "Application of Gold Catalyst for Mercury Oxidation by Chlorine"; Environmental Science & Technology, vol. 40, No. 5; 2006; pp. 1603-1608 (6 pages).
Extended European Search Report issued in European Application No. 14746126.3; dated Sep. 7, 2016 (7 pages).

* cited by examiner

*Primary Examiner* — Nicole M Buie-Hatcher
*Assistant Examiner* — M. Reza Asdjodi
(74) *Attorney, Agent, or Firm* — Osha Liang LLP

(57) ABSTRACT

Methods of mercury decontamination are provided that include: contacting elemental mercury with a metal salt having a standard reduction potential sufficient to oxidize elemental mercury to an aqueous salt of mercury. In other aspects, methods of mercury decontamination are provided that include: contacting the metal surface with a solution comprising a metal salt having a standard reduction potential (E0) of greater than 0.85, thereby oxidizing a mercury contaminant to a soluble mercury salt.

10 Claims, 1 Drawing Sheet

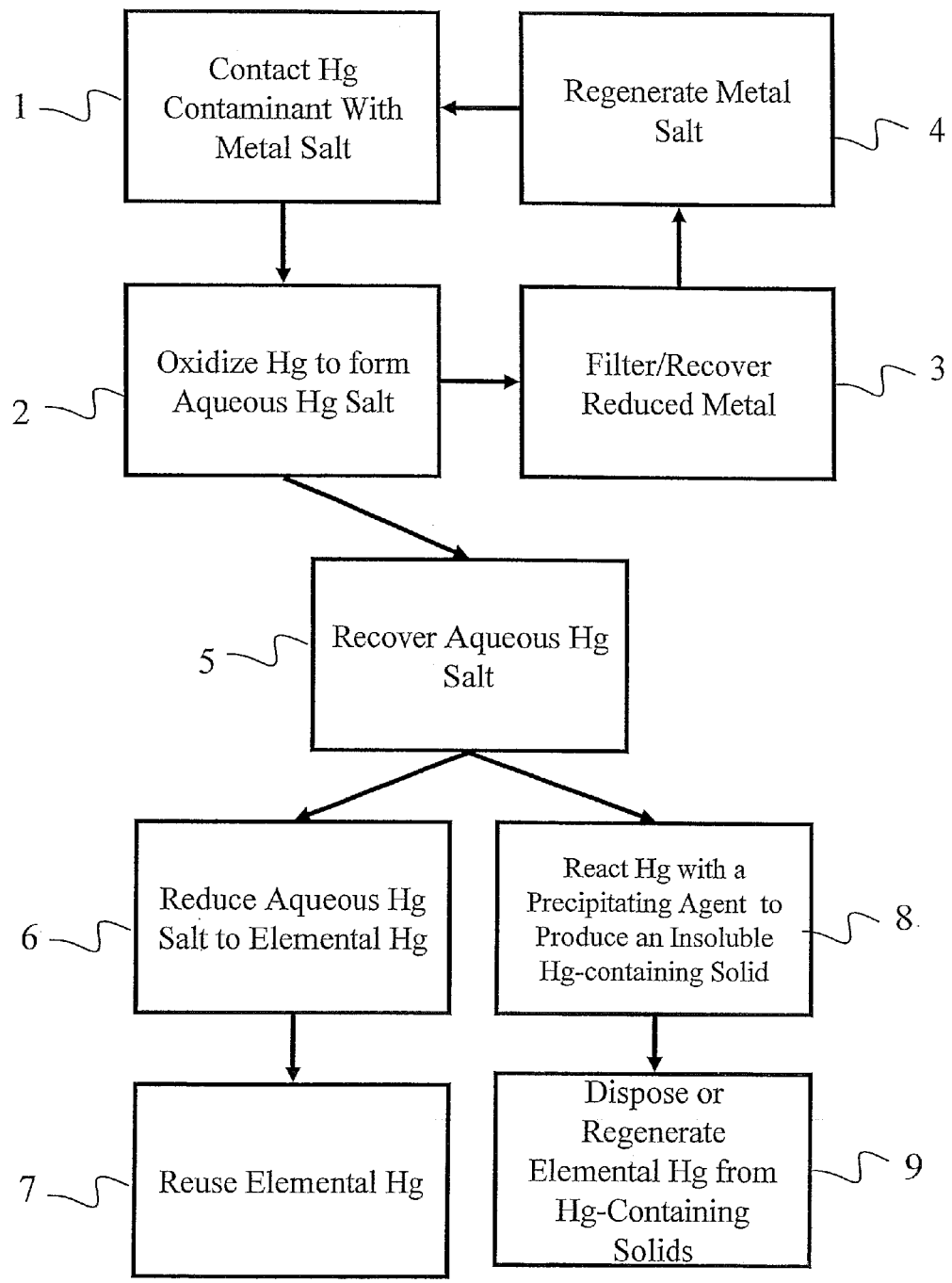

METHOD OF MERCURY DECONTAMINATION

CROSS-REFERENCE TO RELATED APPLICATIONS

This application is a national stage application of PCT/US2014/013174 filed on Jan. 27, 2014, which claims priority to U.S. Provisional Application No. 61/757,961, filed on Jan. 29, 2013, which is herein incorporated by reference in its entirety.

BACKGROUND

During oilfield operations, mercury and mercury salts naturally present in geological formations may accumulate on the surfaces of pipes and vessels over time. This can present a significant safety risk to workers that may be exposed to mercury through skin contact with liquid mercury or inhalation of mercury vapors. As such, mercury is considered a hazardous substance and its safe removal and disposal is a safety priority.

At present the available methods for removing liquid mercury are limited and unsatisfactory. Mercury is insoluble in most solvents and is sparingly soluble in concentrated acids, including nitric acid, sulfuric acid, and aqua regia, which creates challenges in the removal and transport of mercury contaminants. However, the use of acid treatments to clean up mercury spills and surface contamination is disfavored because, in addition to the safety hazards to workers, acid treatments may corrode steel surfaces present on most downhole tools. Moreover, mercury cannot be easily removed using vacuum devices because during suction and filtration fine droplets of mercury and vapor are formed and may be released into the surroundings, exacerbating the problem of contamination.

Other approaches to mercury decontamination also include combining elemental sulfur with the mercury to form mercuric sulfide or cinnabar; a sparingly soluble mineral solid that is much safer to handle due to the reduced inhalation hazard of the solid with respect to elemental mercury. However, although mercury and sulfur combine to form cinnabar, the homogenous reaction of liquid mercury and powdered sulfur may often require physical intervention such as agitation, milling, and/or mixing. Thus, such approaches are limited in their effectiveness and overall reduction of the dangers posed by the presence of toxic mercury vapors.

SUMMARY

In one aspect, methods of mercury decontamination are provided that include: contacting elemental mercury with a metal salt having a standard reduction potential sufficient to oxidize elemental mercury to an aqueous salt of mercury.

In other aspects, methods of removing mercury from a metal surface are provided that include: contacting the metal surface with a solution comprising a metal salt having a standard reduction potential of greater than 0.85, thereby oxidizing a mercury contaminant to a soluble mercury salt.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

FIG. 1 is a flow chart showing a method of mercury decontamination according to embodiments of the present disclosure.

DETAILED DESCRIPTION

In one aspect, embodiments disclosed herein relate to methods for mercury decontamination. In one or more embodiments, methods in accordance with the present disclosure may be used to decontaminate surfaces and materials that have been exposed to mercury contaminants. In particular embodiments, the methods described herein may be used to remove mercury and mercury-based contaminants from equipment used in the drilling or completions of a wellbore and/in hydrocarbon production from subterranean formations.

In embodiments of the present disclosure, decontamination of mercury may be achieved by oxidizing elemental mercury to an aqueous salt of mercury, which increases the solubility of the mercury species and increases the efficiency of mercury removal from contaminated surfaces. In addition, because aqueous salts of mercury are significantly less volatile, aqueous mercury salts are often safer to collect and transport, which decreases the risk of toxic exposure to workers on site.

Oxidation of elemental mercury to an aqueous mercury salt occurs through an electrochemical reaction with an oxidizing agent. The standard reduction potential ($E_o$) for mercury measured under standard conditions, 25° C., and at 1 M concentration is 0.85, relative to a standard hydrogen electrode (SHE). Thus, the oxidation of elemental mercury to form an aqueous salt of mercury proceeds when elemental mercury is contacted with chemical species (or combination of species) having a $E_o$ greater than 0.85. Upon treatment with a compound having a $E_o$ greater than 0.85, referred to herein as an oxidizing agent, mercury may form cations that are often present in either the +1 oxidation state (mercurous) or the +2 oxidation state (mercuric). Mercury cations may also aggregate to form polycations such as $Hg_2^{2+}$, $Hg_4^{2+}$, and $Hg_3^{4+}$, for example.

In one or more embodiments, decontamination of mercury is effected by contacting mercury, contaminated materials, and/or contaminated surfaces with an oxidizing agent that includes an aqueous metal salt solution. The aqueous metal salt solution may convert elemental mercury into an aqueous salt of mercury through an electrochemical reduction-oxidation (or redox) reaction. On contact with the metal salt solution, the mercury is oxidized to form mercuric ions in solution and, likewise, the metal ions of the electrolyte are reduced to solid metal at the surface of the mercury. As the reaction proceeds, each bead or pool of mercury liquid diminishes in size as the mercury is oxidized to form mercuric ions in aqueous solution and the remaining mercury surface becomes coated with metal crystals from the solvent as the metal ions are reduced. Eventually all elemental mercury is oxidized leaving in its place the reduced metal in solid crystalline form.

As introduced above, methods in accordance with the present disclosure may be useful for decontamination of mercury spills and for treating contaminated metal surfaces that have contacted mercury. With particular reference to FIG. 1, Panel 1, mercury contaminants, contaminated surfaces, or contaminated articles are washed or soaked in the selected metal salt solution. Upon contact with the metal salt solution, elemental mercury contaminants are oxidized (Panel 2) to form water-soluble cations that disperse and/or associate with anions in solution, thereby decontaminating the surface or article being soaked or washed. At the same time, metal cations are reduced to neutral metal particles that may aggregate at the surface of the oxidizing mercury, precipitate out, or remain suspended in solution.

Following the oxidation of mercury but prior to processing the aqueous mercury salt, metal particles or precipitants may be removed (Panel 3) by any separation means known in the art such as filtration, centrifugation, settling tanks, and the like. However, depending on the intended application, it is not necessary to remove the reduced metal and the reduced metal will have negligible effects on the subsequent processing steps of the aqueous mercury salt.

Separated metal particles may then be processed and treated with a selected oxidizing agent such as an acid to regenerate the metal salt (Panel 4). The regenerated metal salt may then be recycled and used to oxidize additional mercury contaminants (Panel 1). Aqueous mercury salt may be recovered by either collecting the aqueous solution or removing the soaking decontaminated article from the solution (Panel 5).

Following oxidation and removal of mercury contaminants, the treatment and disposal of the mercury-containing aqueous solution depends on the disposal routes available. For example, the aqueous mercury salts may injected back into the geological formation from where the mercury originated or treated in accordance with applicable safety requirements.

One possible option for treatment of the aqueous mercury salt is to add sufficient quantities of a reducing agent to reduce the aqueous mercury salt to elemental mercury (Panel 6). Because mercury has a higher relative density compared to water, the mercury may be collected as a bottom fraction from a containment vessel and separated. The separated mercury may then be sold or used in commercial manufacturing (Panel 7).

Other possible options include selectively precipitating out the mercury cations using a precipitating agent such as a sulfide to form insoluble mercury-containing aggregates or solids that may be removed from the clarified aqueous fluid (Panel 8). Insoluble mercury-containing aggregates or solids may be separated from the remaining aqueous liquid by separation means known in the art. The remaining mercury-containing aggregates or solids may then be disposed of or subsequently processed to recapture mercury by methods known in the art such as roasting or electrolysis.

Metal Salts

Solutions in accordance with embodiments described herein may contain metal salts having a standard reduction potential sufficient to oxidize mercury contaminants to $Hg^{+1}$ and/or $Hg^{+2}$ cations and polycations. In particular embodiments, the $E_o$ of the metal salts is greater than 0.85. It is also envisioned that aqueous metal salt solutions may be used to increase the efficiency of other mercury oxidation techniques known in the art such as electrolysis and electrocoagulation.

In one or more embodiments, metal salts used to oxidize mercury may be selected from metals that fall below mercury in the reactivity series of metals, which includes, for example, silver, gold and platinum. While using silver salts may be favorable due to cost considerations, chemical costs may be offset by recapturing the reduced metal produced from the oxidation of mercury. In one or more embodiments, the anion for the metal salt may be selected from nitrate, nitrite, sulfate, hyposulfite, hydroxide, halides, and the like.

In some embodiments, metal salt solutions may be diluted with deionized water to prevent the presence of competing anions from forming insoluble metal salts with the selected metal cations. For example, water sources containing chloride ions at sufficient concentration may react with metal cations to produce insoluble precipitates, thereby reducing the efficiency of the oxidation-reduction mercury decontamination process. For particular applications the metal salt may be soluble in water to at least 0.025N to aid in the dispersibility of the salt. However, the water solubility of the salts does not affect the reactivity of the metal salts and in some applications a partially soluble slurry of a metal salt may be added to decontaminate surfaces, for example.

Metal salts may be applied to a mercury contaminated source by mixing, spraying, or washing, for example. In some embodiments, contaminated articles may be submerged partially or completely in a solution of metal salts. Oxidation of the mercury may be allowed to proceed over a soak period of 2-12 hours, at which time an aqueous mercury salt can be removed with the aqueous liquid by draining, pumping, or, in the case that contaminated item has been immersed in a bath of metal salts, the decontaminated item can be removed from the aqueous solution. Additionally, traces of aqueous fluids that contain dissolved mercury can be rinsed from metal surfaces and then collected for disposal along with the recovered aqueous mercury salts.

Metal salts may be added to a mercury contaminant in molar equivalents to mercury in some embodiments, and in molar excess in other embodiments. In yet other embodiments, one or more metal salts may be added to a mercury contaminant at a concentration that ranges from 0.025 N to 1 N, and 0.05 N to 0.1 N in other embodiments. However, the concentration of the metal salt may be increased or decreased depending on the concentration of the mercury contaminant present and the demands of the particular method of application.

Following oxidation of the mercury, the aqueous solution may contain molar equivalents of solid metal produced from the reaction of the metal salt with mercury. Reduced metals may be recovered and recycled in order to decrease the overall costs of the method. Recovery of suspended metal particles from solution may be achieved by any standard processes known in the art such as, for example, filtration, centrifugation, and/or settling out. In some embodiments, captured metal particles may be washed, regenerated to produce metal salts, and reintroduced to the above described process to oxidize mercury contaminants.

Crystal Habit Modifiers

Depending on the size of the mercury spheres to be oxidized or the geometry of the location of the mercury bead, such as when the mercury is located in a pit in a steel surface, the mercury can become completely coated with reduced metal crystals creating a barrier between the mercury and the metal salt solution so that the reaction stops prematurely leaving residual elemental mercury contaminants.

One way that this may be prevented is by introducing molecules which act as crystal habit modifiers before, after, and/or during the addition of the metal salts to the mercury contaminants. Crystal habit modifiers may disrupt the formation of large crystals that prevent the complete oxidation of mercury by covering the surface of the elemental mercury. For example, when metal salts containing silver are used to oxidize mercury, the usual dendritic needle crystal growth is disrupted by the presence of crystal habit modifiers, resulting in the formation of smaller crystals at the mercury/solution interface. The distorted crystals appear to allow continuous contact between the mercury contaminant and the electrolyte during the redox reaction until all the mercury has been oxidized to form mercuric ions in aqueous solution. In some embodiments, the presence of crystal modifier may slow down the reaction kinetics slightly, but this effect is offset by the increase in conversion of the elemental mercury to mercury cations.

In one or more embodiments, crystal habit modifiers may be glycols such as monoethylene glycol, diethylene glycol, triethylene glycol, and polyethylene glycol. In other embodiments, the crystal habit modifier may be selected from polymers or copolymers of vinylpyrrolidone/vinyl acetate polymers, polyethylene oxide polymers, polyethylene glycols, polyoxyethylene-polyoxypropylene glycol copolymers, polyoxyethylene castor oil derivatives, long chain C12-C18 fatty acid glycerides, polyacylate, polyacrylamide, polymaleic acid, polyitaconic acid, polyvinyl phosphonate, and mixtures thereof.

Crystal growth modifiers may be added to the mercury contaminant in molar equivalents to mercury in some embodiments, and in molar excess in other embodiments. In yet other embodiments, one or more crystal habit modifiers may be added to a mercury contaminant at a concentration that ranges from 0.25 w/w % to 2 w/w %, and 0.5 w/w % to 1.0 w/w % in other embodiments.

In particular embodiments, crystal habit modifiers may be added to a mercury contaminant prior to, along with, or following the application of a metal salt. It is also within the scope of this disclosure that more or less of a crystal habit modifier be added depending on the concentration of the mercury contaminant and the desired application.

Precipitating Agents

Upon oxidation of elemental mercury to form a mercury salt, the mercury salt may be precipitated by adding a precipitating agent in order to precipitate aqueous mercury salts as a solid mineral such as cinnabar. The formation of mercury-containing precipitates may be useful or required in order for disposal. For example, the addition of sodium sulfide to an aqueous mercury salt will result in the formation of mercuric sulfide or cinnabar, which can be isolated by filtration and disposed of as a solid waste or later processed to recover elemental mercury through roasting or other methods known in the art.

In one or more embodiments, precipitating agents may be selected from alkali metal sulfide, alkali metal hydrogen sulfide, mercaptans thiocarbonate, dithiocarbonate, trithiocarbonate, and mixtures thereof. Precipitation of mercury salts as mercury oxide may also be achieved by raising the pH using an alkali salt such as potassium hydroxide or sodium hydroxide in some embodiments. Precipitating agents may be added to the aqueous mercury salts in molar equivalents to the mercury cation in some embodiments, and in molar excess in other embodiments.

Reducing Agents

Following oxidation of the mercury to an aqueous mercury salt, the mercury-rich aqueous phase may be collected and the mercury may be separated from the remaining aqueous phase by adding a reducing agent (or combination of reducing agents) that reduces the mercury salt to elemental mercury. For example, elemental mercury can be recovered from an aqueous mercury salt solution by adding strips of a metal such as copper or aluminum so that the mercury ions are reduced during the oxidation of the particular metal. Similarly, any remaining metal cations from the metal salt used to oxidize the mercury may be subsequently removed by selecting an appropriate reducing agent or combinations of reducing agents.

In one or more embodiments, the reducing agent may be one having a standard reduction potential less than 0.85, sufficient to reduce aqueous mercuric and mercurous salts to elemental mercury. In other embodiments, the reducing agent may be at least one metal such as copper, aluminum, iron, zinc, magnesium, or tin. Other suitable reducing agents include ferrous sulfate, sodium borohydride, sodium dithionite, thiourea, hydroxylamine, tris(2-carboxyethyl)phosphine hydrochloride, and other reducing agents known in the art.

The amount of reducing agent required is proportional to the concentration of the mercury cations present in the aqueous mercury salt. Reducing agents may be added to the aqueous mercury salts in molar equivalents to the mercury cation in some embodiments, and in molar excess in other embodiments. Moreover, when applied in oilfield or geological exploration operations, one skilled in the art with aid of this disclosure will appreciate that the concentration and composition of metal salts and reducing agents may be optimized depending on the extent of the mercury concentration in a particular field. It is also within the scope of this disclosure that combinations of reducing agents may be used to increase the efficiency of mercury reduction.

EXAMPLE

In an exemplary embodiment of the invention, elemental mercury is oxidized using silver nitrate as the metal salt oxidant. As the mercury is oxidized to mercuric ions, solid silver crystals are formed in the corresponding reduction reaction, which is illustrated in the formula below.

$$Hg(1)+AgNO_3(aq) \rightarrow HgNO_3(aq)+Ag(s)$$

During the oxidation of elemental mercury to aqueous mercury salts, crystal habit modifiers (or combinations thereof) may be added in any order to aid the complete oxidation of mercury. It is within the scope of the disclosure that crystal habit modifiers be added to the elemental mercury before or after the metal salts, mixed with the metal salts prior to addition to the metal salts, or any combination of the above.

The resulting solution following the oxidation of elemental mercury by metal salts will contain an aqueous mercury nitrate and particulate silver and/or colloidal silver. Solid silver particles formed may then be recovered by separation means such as filtration or centrifugation. The silver particles can then be washed and re-dissolved in nitric acid to reconstitute the silver nitrate oxidation agent.

Following oxidation, the mercury nitrate product formed may be recovered as a solid by the addition of a sodium sulfide precipitating agent to form solid mercuric sulfide which may then be isolated by filtration or other separation means known in the art. The overall precipitation reaction is shown below.

$$HgNO_3(aq)+NaS(aq) \rightarrow HgS(s)+NaNO_3(aq)$$

Alternatively, the aqueous mercury salt may be directly converted to elemental mercury by adding a reducing agent such as copper metal to the mercuric nitrate to form liquid mercury, according to the equation shown below.

$$HgNO_3(aq)+Cu(s) \rightarrow Hg(1)+CuNO_3(aq)$$

The elemental mercury produced may then be captured and used in any number of commercial processes known in the art.

The methods described herein may be used as a non-corrosive treatment for treating any wellbore tools that may include, but are not limited to, drill bits, drill strings, tubulars, liners, completion equipment, production equipment, metal decking, containers, vessels, piping, coiled tubing, and the like.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Moreover, embodiments described herein may be practiced in the absence of any element that is not specifically disclosed herein.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. A method of mercury decontamination comprising: obtaining an aqueous solution comprising an aqueous salt of mercury by adding a nitrate salt to elemental mercury on a contaminated surface or in a contaminated material, and contacting the elemental mercury with one or more crystal habit modifiers selected from a group consisting of glycols and polyvinyl pyrrolidone, and recovering the aqueous solution from the contaminated surface or the contaminated material.

2. The method of claim 1, wherein the nitrate salt has a standard reduction potential of greater than 0.85.

3. The method of claim 1, wherein the nitrate salt comprises one or more salts selected from a group consisting of salts of silver, gold, and platinum.

4. The method of claim 1, further comprising recovering a solid metal corresponding to the cation of the nitrate salt.

5. The method of claim 1, further comprising contacting the aqueous salt of mercury with a precipitating agent to produce a solid mercury-based mineral.

6. The method of claim 5, wherein the precipitating agent is one or more selected from sulfides and elemental sulfur.

7. The method of claim 1, further comprising contacting the aqueous salt of mercury with a reducing agent having a standard reduction potential of less than 0.85.

8. The method of claim 7, wherein the reducing agent is one or more metals selected from a group consisting of copper, aluminum, and iron.

9. The method of claim 8, further comprising recovering elemental mercury.

10. The method of claim 1, wherein the aqueous salt of mercury is mercurous nitrate.

* * * * *